No Printed Specification Available
S. Andrews,
Lock.
9310X
Patented Jan. 11, 1836.
Fig: 1.
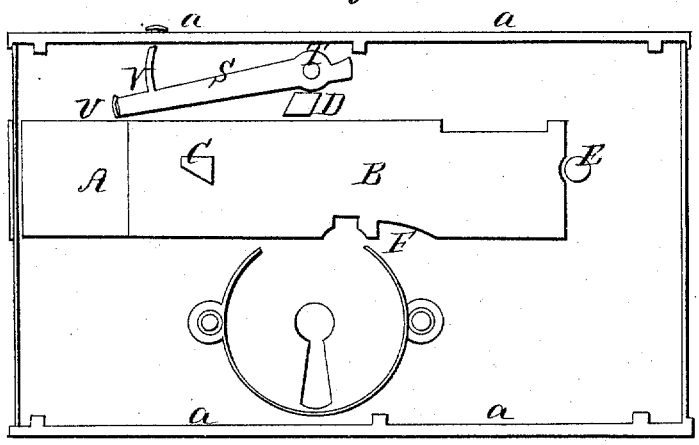
Fig: 2.
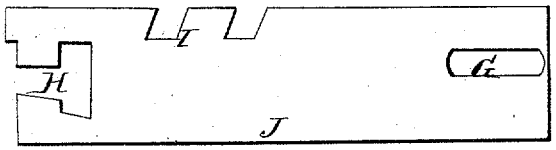
Fig: 3.
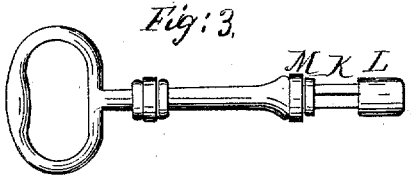
| | | | | |
|---|---|---|---|---|
| 1 | 1 | | | |
| 2 | | 2 | | |
| 3 | | | 3 | |
| 4 | | | | 4 |
| 5 | 1 | 2 | | |
| 6 | 1 | | 3 | |
| 7 | 1 | | | 4 |
| 8 | | 2 | 3 | |
| 9 | | 2 | | 4 |
| 10 | | | 3 | 4 |
| 11 | 1 | 2 | 3 | |
| 12 | 1 | 2 | | 4 |
| 13 | 1 | | 3 | 4 |
| 14 | | 2 | 3 | 4 |
| 15 | 1 | 2 | 3 | 4 |
Fig: 14.
Fig: 4. Fig: 5 Fig: 6. Fig: 7. Fig: 8. Fig: 9.
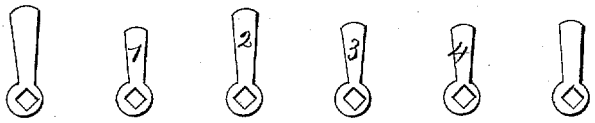
Fig: 10. Fig: 11. Fig: 12. Fig: 13.
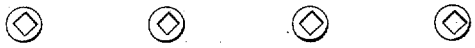
AM. PHOTO-LITHO. CO. N.Y. (OSBORNE'S PROCESS.)

9310X

Jan. 11. 1836

Solomon Andrews of Perth Amboy New Jersey

Letters Patent

The Schedule referred to in these Letters Patent and making part of the same containing a description in the words of the said Solomon Andrews himself of his improvement in the Lock.

To all persons to whom these presents shall come, Solomon Andrews M.D. of the City of Perth Amboy in the County of Middlesex and State of New Jersey sends Greeting. Be it known that I Solomon Andrews have invented constructed made and applied to use a new and useful improvement in Locks and which said improvement is specified by reference to the plate annexed and in the words following to wit.

Fig 1 represents the plate of the lock without its cap a.a. a.a the rims of the Lock A. the head of the bolts. B the tail of the bolt C a stump rivetted or otherwise firmly fastened into the tail of the bolt the shape of which is shown in the plate and which stump extends or projects nearly to the cap of the Lock. D a diamond shaped stump rivetted or attached firmly to the plate of the Lock above the tail of the bolt and extending to the cap or through it. E a round stump rivetted or attached firmly to the plate of the Lock behind the bolt and extending through the cap. These stumps are made of steel or iron or any other suitable material. and the two stumps D and E are very similar to those used in other Locks. F a notch made into the lower edge of the bolt behind the back talent in order to weaken the back talent so that it shall break off when undue force is applied to open the Lock. Fig 2 a tumbler made of sheet steel or iron or other suitable material having a groove or slit in the back end of it marked G instead of a round hole as in a common tumbler. which groove or slit is to allow the tumbler to slide upon the round stump E Fig 1. as will hereafter more fully appear. The said tumbler has also a notch or rack as it is sometimes called by Lock Smiths in the other end. or fore end marked H similar to the common tumbler which notch is fitted and adapted to the stump C. Fig 1. allowing the said bolt stump C to pass out of or into the said notch or rack as the bolt is thrown out or thrown back by the key
when the tumbler is properly lifted and which notch is so constructed as to hold
fast the said stump C. by the weight of one end of the tumbler resting on the said stump
so as to be drawn out by the said stump with the bolt when not lifted by the
key the aforesaid groove or slit G. allowing of such sliding motion to the tum
bler on the stump C. Fig 1. The said tumbler has also a fin or projec
tion on its upper edge marked H which fin or projection is formed between
two notches in the said upper edge of the tumbler the intervening portion
or projection constituting the said fin. This fin or projection is so sit
uated or placed on the upper edge of the tumbler as to be immediately
behind the stump D. Fig 1. When the tumbler is placed in the lock
with the bolt thrown back and immediately before the said stump
D. when the bolt is thrown out and the tumbler drawn out with it
as herein before described. The use of the said fin is to prevent the
bolt being thrown back by the said fin striking against the stump
D. Fig 1. when the tumbler is lifted after being drawn out with the
bolt, the lower edge of the tumbler marked I is straight not
concave nor convex as is the case in the usual or common tumbler
where the key acts upon it. In the ~~usual~~ tumblers of one lock
all the lower edges of them correspond and are similar so as to form
one smooth and regular or even surface particularly in that part or
portion of them exposed to the key hole or where the key acts upon them
and in the several tumblers of one lock all the mouths of the notches mark
ed K. Fig 2. are placed at different heights or places in their several fore
ends so that the said tumblers shall require to be lifted to differ
ent heights or distances to allow the bolt stump C to pass into
or out of the several notches. Fig 3. the Key without any bits
on it the end or key pin being square and marked K. and having
a nut L. screwed on the extreme end of it, which nut is round and
forms a part of the key pin and corresponds in diameter with the
round shoulder M of the said Key pin, from whence the key pi
originates. Figures 4.5.6.7 8.9. The bits with a square hole
in each fitted to the square part of the key pin so as to be put on and latter of all pleasures. One of the bits fig 9. is to be placed on one
end of the square part of the Key pin K. and always to remain there
[illegible] which has a round hole in the back edge
when the Key is used in order to lift one of the tumblers, like a com
mon or ordinary tumbler and consequently must always be lifted.
One other bit to each Key Fig 4. is made thicker and stronger than the
others. it is to be placed on the other end of the square part of the Key
pin and is intended to work against the talents of the bolt to move
the bolt out or in. The other or intervening bits Figures 5. 6. 7. 8
are numbered as in the plate and are intended to lift or raise the before
described [illegible] or changeable tumblers. These bits are of different
lengths, each one adapted to a particular tumbler, being longer or
shorter as the corresponding tumbler on which it acts requires to be lifted
more or less to allow the bolt stumps C to pass out of or into the
notch HC and each one numbered to correspond with its respective
tumbler in order to show its relative place on the Key. the numbers
usually commencing at the shoulder of the Key pin; as, a matter of
convenience, I sometimes mark these bits with characters or hier
oglyphics. Figures 10. 11. 12. 13 Rings or blanks fitted to the
square part of the Key pin of the same diameter as the end and shoul
der of the Key pin and of the same thickness as the numbered or chang
able bits. One of these Rings is, to be put upon the Key pin to fill up
the space when a bit is taken off.
Fig 14. a table of combinations or changes, to show the different
forms of which the Key is susceptible and to assist the operator in remem
bering the Key he uses in locking by reference to the register number.
Each combination is numbered in the marginal column which num
bers I call Register number (see plate Fig 14.) The number of chan
ges in a lock will of course depend upon the number of grooved or
changeable tumblers it contains and their corresponding numbered bits.
S Fig 1. a lever which works upon a round stumpe T. and shown
in its proper place in the lock extending forwards beyond the fore ends
of the tumblers when in their natural position, and having a bar U
attached to the end of it which bar is at right angles with the lever and extends from the plate of the lock to the cap directly across the up
per edges of the tumblers when they are drawn out by the bolt. there
is also attached to this lever a curved wire or rod V. which projects
through the upper rim of the lock, and moves freely through it when
the lever is lifted or depressed, or the end of the bar U may project throug
the plate of the lock and work freely in a curved groove made for
the purpose. The lever is retained in whatever position it is left either
up or down by a spring which presses upon the back end of it.
This lever with its fixtures I call a detector, its use is to shew wheth
er a false key or other improper instrument has been introduced in
to the key hole and the tumbler lifted. should one or more of the tum-
blers be drawn out with the bolt when the lock is locked, such tum
bler or tumblers will pass underneath the bar U. of the lever S.
Fig 1. and if either of the tumblers so drawn out are then lifted the
bar and lever will also be lifted and remain in that position which
will be detected by the rod or wire V. then projecting through the rim
of the lock, the lever may then be returned to its former position
by pressing upon the end of the wire V. so as to be ^again^ ready to be again opera
ted on by a false key. In these locks I seldom make less
than six changeable or grooved tumblers, and sometimes as many as
twenty. which latter number gives more than a million of changes.
and I so construct the locks that no two shall be alike or have
a similar key unless especially ordered, making the tumblers and their
corresponding bits or key bits more or less in number in every lock or
of different thicknesses or to raise more or less in weight or more
or less difference in the raising or lifting of the several tumblers of
each lock. and by the different relative positions of the tumblers hav
ing the several different lifts in different Locks.

I claim as my Invention the groove or slit in a tumbler as
herein before set forth by means of which groove or slit the tum
bler admits of two distinct motions or operated or not operated on
by the key. I claim as my invention the pin or projection on the
upper edge of the tumbler together with the stump against which the

9310X 1-11-1836 said first projection strikes and meets resistance when the tumbler
is improperly operated upon by the key or other instrument.
I claim as my invention the similarity or straight and even and reg-
ular edges of the several tumblers in one lock forming a regular surface
in that part or portion of them exposed to the key hole where the key oper-
ates upon them whilst the notches or racking in the fore ends of them are
so constructed in relation to the bolt stump as to require the said tum-
blers to be lifted different heights or distances in order to allow the bolt
stump to pass into the said notches when the bolt is thrown back by
which regular and even surface of the lower edge of the tumblers a false
impression is given as to the formation of the key.
I claim as my invention the dissimilarity in the length of the
bits of a key which operate upon the similar or even and regular sur
face or edges of the tumblers, but not so as to correspond with the irregu-
lar mouths of the notches on the tumblers at the bolt stump where
no impression of them can be taken through the key hole.
I claim as my invention the manner of changing the key by taking
off the bits and substituting things instead thereof by which blank
spaces left in the key the tumblers corresponding to those absent bits
are not lifted when the key is turned, and by which change
in the key the lock is locked differently, and so that no other
formation of the same key will unlock the lock.
I claim as my invention the tables of changes or combina-
tions as herein before set forth as applied to the purpose of chan-
ging the key to a Lock.
I claim as my Invention the herein before described detector for
ascertaining whether a false key or other improper instrument has
been applied to the Lock to lift the tumblers.
And I further claim as my invention the aforesaid application of
the several parts of the herein before described Lock. and I also claim as
my invention the weakening the back talons of the bolt so that it shall
break off when too much force is applied to force open the Lock
In testimony that the above is a true specification of my said 9310X 1-11-1836 6.

310.

improvement as above described. I have hereto set my hand this thirteenth day of October in the Year of our Lord one Thousand Eight hundred and Ninety Five Witnesses
Nicholas Laforge
Henry D. Redden Solomon Andreas (2324 Words)

(Granted January 11. 1836)

Drawing